(12) United States Patent
Sugiura et al.

(10) Patent No.: US 6,618,917 B2
(45) Date of Patent: Sep. 16, 2003

(54) COMPLEX MACHINING TOOLS

(75) Inventors: Hitoshi Sugiura, Gifu-ken (JP); Yoshinobu Yasuda, Gifu-ken (JP); Masami Funamoto, Kyoto-fu (JP); Kaoru Kobayashi, Kyoto-fu (JP)

(73) Assignee: Dainichi Kinzoku Kogyo Co., Ltd., Amagasaka (JP)

( * ) Notice: Subject to any disclaimer, the term of this patent is extended or adjusted under 35 U.S.C. 154(b) by 0 days.

(21) Appl. No.: 09/939,745

(22) Filed: Aug. 28, 2001

(65) Prior Publication Data

US 2003/0041706 A1 Mar. 6, 2003

(51) Int. Cl.$^7$ .............................................. B23Q 39/00
(52) U.S. Cl. ........................ 29/27 C; 82/1.11; 82/121; 82/129; 409/12; 409/11
(58) Field of Search .................... 82/121, 120, 1.11, 82/131, 152, 129; 29/27 R, 27 C, 27 A, 564, 565; 409/20, 21, 22, 23, 24, 25, 26, 11, 12

(56) References Cited

U.S. PATENT DOCUMENTS

| | | | | |
|---|---|---|---|---|
| 3,105,412 A | * | 10/1963 | Tookey | ........................ 409/21 |
| 5,117,544 A | * | 6/1992 | Kousaku et al. | ............. 29/27 C |
| 5,289,622 A | * | 3/1994 | Minagawa | .................. 29/27 R |
| 5,312,210 A | | 5/1994 | Lovekamp | |
| 5,313,694 A | * | 5/1994 | Yonemoto et al. | .......... 29/27 R |
| 5,490,307 A | * | 2/1996 | Link | ........................... 29/27 C |
| 5,885,199 A | * | 3/1999 | Shao | ............................ 483/19 |
| 6,079,090 A | * | 6/2000 | Ongaro | ........................ 29/27 C |

FOREIGN PATENT DOCUMENTS

| | | |
|---|---|---|
| JP | 5656337 | 5/1981 |
| JP | 5662721 | 5/1981 |
| JP | 11 197901 | 7/1999 |

* cited by examiner

Primary Examiner—Daniel W. Howell
(74) Attorney, Agent, or Firm—Dennison, Schultz & Dougherty

(57) ABSTRACT

A headstock 10 having a chuck 12 and a tailstock 20 having a shaft 21 are mounted on a bed 1 and can move with respect to each other in the direction of the Z-axis, A carriage 50 is slidably mounted on the bad 1 and can move in the Z-axis direction with respect to the rotational axis of a spindle 11. A turning device (lathe tool) 30 is provided to perform a turning operation on a workpiece and a gear cutting device 40 is provided to perform a gear cutting on the workpiece. The turning device 30 and the gear cutting device are preferably slidably mounted on the carriage 50 in a side-by-side relationship. The turning device 30 and the gear cutting device 40 may have respective traverse slide bases 31 and 41. The traverse slide bases 31 and 41 are mounted on the carriage 50 and can move independently in the direction of the X-axis perpendicular to the axis of the spindle 11, i.e. in a traverse sliding direction.

11 Claims, 3 Drawing Sheets

COMPLEX MACHINING TOOLS

BACKGROUND OF THE INVENTION

1. Field of the Invention

The present invention relates to machining tools for performing turning (lathe) and gear cutting operations on a workpiece.

2. Description of the Related Art

Japanese Laid-Open Patent Publication No. 11-197901 discloses a gear cutting device that is mounted on a turret of a numerically controlled lathe. Japanese Laid-Open Patent Publication No. 56-56337 discloses a gear cutting device that is provided separately from the turret. These machine tools are capable of performing a turning operation by using a turning tool attached to the turret and a gear cutting operation by using a gear cutting tool attached to the gear cutting device.

However, in the former complex machining tool, the drive mechanisms of the turning device and the gear cutting device are incorporated in the turret. Therefore, the construction is complicated and the turret is large in size. In the latter complex machining tool, the turning device and the gear cutting device are separately constructed, which increases the number of parts and thus the manufacturing cost of the machine tool.

SUMMARY OF THE INVENTION

It is, accordingly, one object of the present teachings to reduce the number of parts and thus the cost and size of complex machining tools that have a turning device (e.g., a lathe tool) and a gear cutting device (e.g., a hob). For example, the turning device and the gear cutting device may commonly utilize components in order to reduce the number of parts necessary to construct and operate the machining tool.

In one aspect of the present teachings, complex machining tools include a turning device and a gear cutting device. Preferably, the turning device and the gear cutting device are mounted on a single carriage. The carriage can move in a direction generally parallel to a rotational or longitudinal axis of a workpiece mounted between a headstock and a tailstock. By providing a single carriage on which both the turning device and the gear cutting device are mounted, components necessary to move the turning device and the gear cutting device in the direction generally parallel to the rotational or longitudinal axis of the workpiece can be commonly used. As a result, complex machining tools are taught that are capable of performing turning and gear cutting operations using a single carriage, which can substantially reduce the number of parts and thus can be manufactured at a reduced cost.

In another aspect of the present teachings, the turning device and the gear cutting device are arranged and constructed such that each can be moved independently on the carriage in a direction generally perpendicular to the rotational or longitudinal axis of the workpiece. As a result, when one of the turning device and the gear cutting device is used for machining the workpiece, the other device can be withdrawn to a position that will prevent interference with the device that is machining the workpiece.

In another aspect of the present teachings, machining methods are taught in which the turning device and the gear cutting device are mounted on a single carriage that can move in a direction generally parallel to the rotational or longitudinal axis of the workpiece. Accordingly, when a workpiece is machined using one of the turning device and the gear cutting device, the other (not used) device is moved to a position remote from the workpiece. For example, the turning device and the gear cutting device can be moved in a direction generally perpendicular to the rotational or longitudinal axis of workpiece.

Additional objects, features and advantages of the present invention will be readily understood after reading the following detailed description together with the accompanying drawings and the claims.

DETAILED DESCRIPTION OF THE INVENTION

Figure 1:
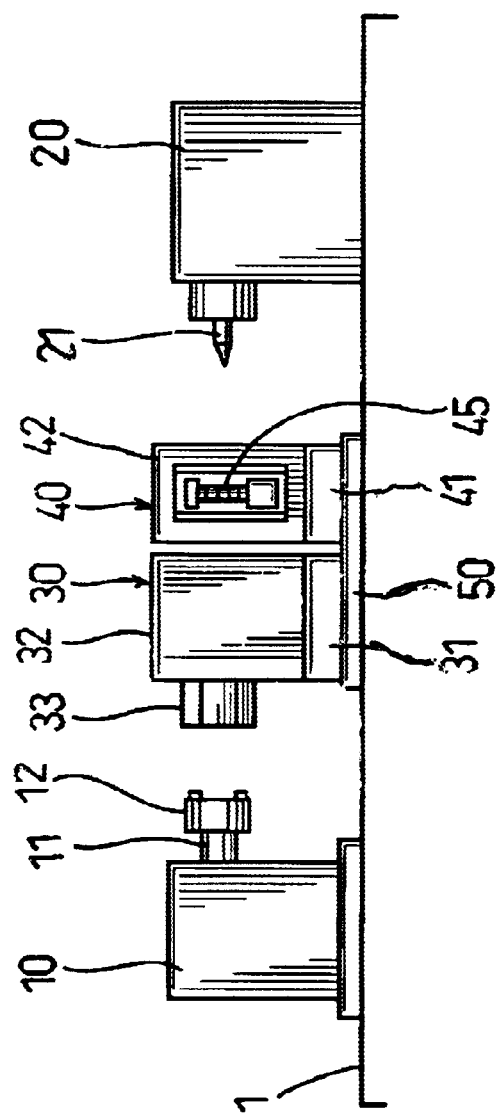
FIG. 1 is a schematic front view of a representative embodiment of the present teachings.

Some workpieces require both turning (lathe) and gear cutting operations in order to manufacture a part or machine tool. Therefore, complex machining tools having a turning device and a gear cutting device are known that can turn (lathe) and cut gear teeth into a workpiece without the need for removing the workpiece from the machining tool. However, the known complex machining tools are either complicated in construction and large in size, or require a relatively large number of parts to form and operate the turning and gear cutting components.

In order to overcome this problem of the known complex machining tools, in one representative embodiment, a turning device and a gear cutting device are both mounted on a single carriage, which carriage can move in a direction generally parallel to the rotational axis of a spindle of a headstock for supporting one end of a workpiece. Thus, the carriage can also move in a direction that is generally parallel to the rotational axis of the workpiece. As a result, turning (lathe) and gear cutting operations can be sequentially performed on the workpiece that is supported by the headstock and the tailstock. Further, because the turning device and the gear cutting device are mounted on the single carriage, the devices can be moved in the direction generally parallel to the rotational axis of the spindle by using a common set of components (e.g., a common sliding mechanism). Therefore, the required number of components can be reduced, thereby reducing manufacturing costs.

Further, according to this representative embodiment, when the workpiece is machined using one of the devices, the other (not used) device may be withdrawn in order to avoid interference with the machining operation that is currently being performed. For example, the device that is not being used can be moved to a position remote from the workpiece. More preferably, the device that is not being used is moved in a direction that is generally perpendicular to the rotational axis of the spindle of the headstock. Therefore, the turning device and the gear cutting device are preferably constructed such that each can be moved independently on the carriage in a direction generally perpendicular to the rotational axis of the spindle of the headstock. Consequently, when one of the turning device and the gear cutting device is engaged with the workpiece in order to perform a machining operation, the other device can be readily moved to a withdrawn position that is remote from the rotational axis of the spindle.

In another aspect of the present teachings, machining methods are taught in which the workpiece is machined using one of the turning device and the gear cutting device, while the other (unused or idle) device is withdrawn to a position that is remote from the rotational axis of the spindle of the headstock. Preferably, the turning device and the gear cutting device are capable of moving or sliding on the carriage in a direction that is perpendicular to the rotational axis of the spindle.

Each of the additional features and constructions disclosed above and below may be utilized separately or in conjunction with other features and constructions to provide improved complex machining tools and methods for designing and using such machine tools. Representative examples of the present invention, which examples utilize many of these additional features and constructions in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and constructions disclosed in the following detail description may not be necessary to practice the invention in the broadest sense, and are instead taught merely to particularly describe some representative examples of the invention.

Figure 2:
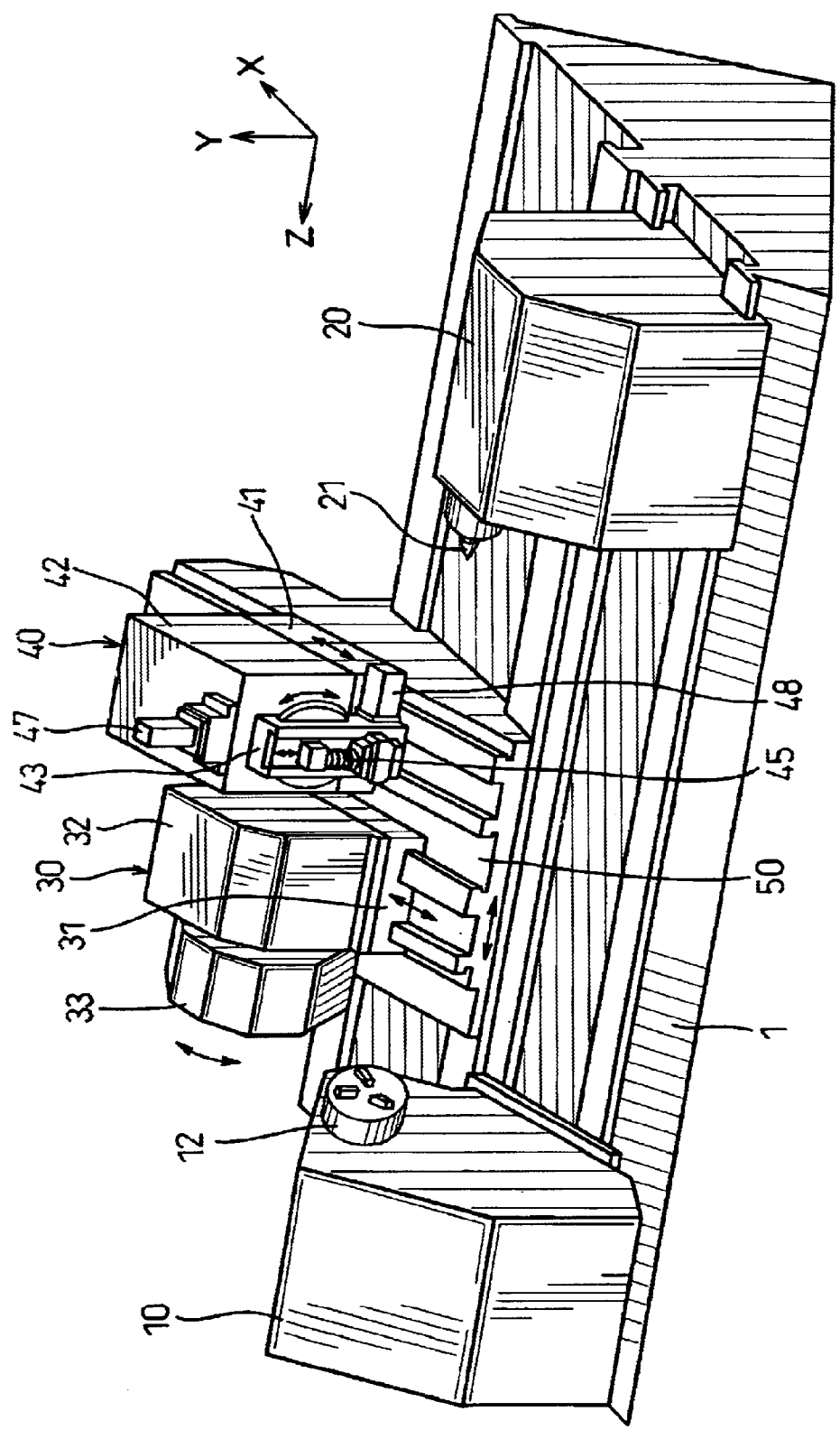
FIG. 2 is a perspective view of the representative embodiment.
Figure 3:
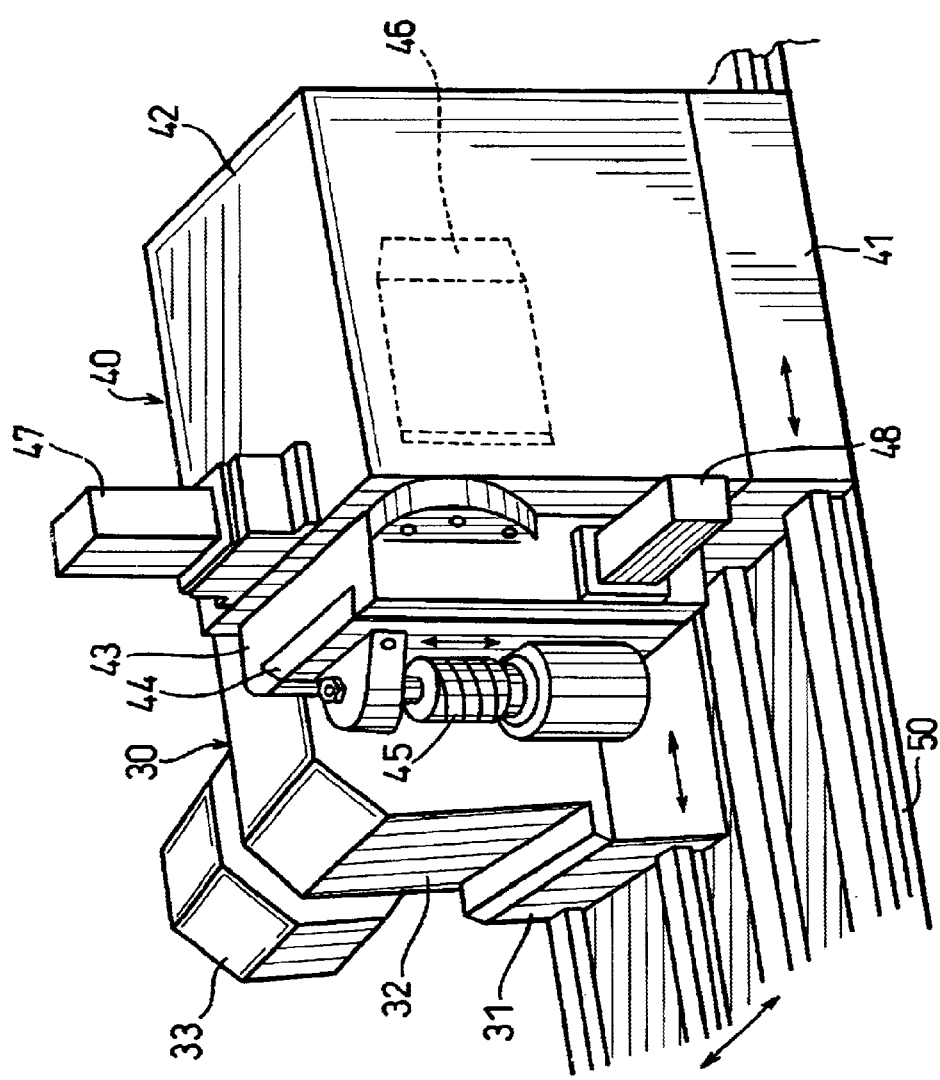
FIG. 3 is another, more detailed perspective view of the representative embodiment.

A representative complex machining tool may be constructed, for example, by mounting a gear cutting device (e.g., a hob machine) on an NC lathe. FIG. 1 shows a schematic front view of this representative embodiment, FIG. 2 is a perspective view thereof, and FIG. 3 is a perspective view showing an expanded portion of the representative embodiment. As shown in FIG. 1, a headstock 10 and a tailstock 20 may be oppositely disposed on and supported by a bed 1.

The headstock 10 may preferably include a chuck 12 adapted to retain one end of a workpiece (not shown for the purposes of clarity of illustration) and the tailstock 20 may preferably include a shaft 21 adapted to supporting the other end of the workpiece. The headstock 10 and tailstock 20 are arranged and constructed so that at least one can slide on or move along the bed 1. Therefore, the distance between the headstock 10 and tailstock 20 can be changed or adjusted in accordance with the length of the workpiece. The chuck 12 may be fixedly attached to the end of a spindle 11. During a turning (lathe) or gear cutting operation, a drive motor (not shown) drives (e.g. rotates) the chuck 12 at an appropriate speed for the particular operation. The shaft 21 of the tailstock 20 rotates together with the workpiece while also supporting the workpiece.

A carriage 50 is slidably mounted on the bed 1 and is disposed to one side between the headstock 10 and tailstock 20. That is, the carriage 50 preferably is disposed outside of an imaginary line connecting the headstock 10 and tailstock 20. A turning device (lathe tool) 30 and a gear cutting device 40 are mounted on the carriage 50 and are disposed side by side.

The carriage 50 is arranged and constructed to move in the direction of the Z-axis, which may be a horizontal direction that is parallel to the rotational axis of the spindle 11 (i.e. the longitudinal direction with respect to the bed 1 and the workpiece). A sliding mechanism (not shown) may couple the carriage 50 to the bed 1 in order to permit the carriage 50 to move or slide in the Z-axis direction. The sliding mechanism may include, for example, an electric motor, a ball screw and a nut, and other components, which are not shown, although the present teachings are not limited to any particular sliding mechanism design.

The turning device 30 and the gear cutting device 40 preferably include respective traverse slide bases 31 and 41. The traverse slide bases 31 and 41 are mounted on the carriage 50 and are constructed to move independently in the direction of the X-axis, which is the direction of the depth of cut (i.e. in the direction perpendicular to the rotational axis of the spindle 11 or the traverse direction with respect to the carriage 50). A sliding mechanism (not shown) that is similar to the sliding mechanism for the carriage 50 may be utilized to move the traverse slide bases 31 and 41 in the X-axis direction, although naturally other designs may be utilized with the present teachings.

The turning device 30 preferably includes a turning head unit 32 that is mounted on the traverse slide base 31. A turret 33 may be mounted on the turning head unit 32 and may rotate about a rotational axis that is parallel to the spindle 11. A variety of turning or lathe tools can be attached to the turret 33 in order to perform various machining operations on the workpiece. Further, an indexing mechanism (not shown) may be provided on the turning head unit 32. By rotating the turret 33, the indexing mechanism may be utilized to position the selected turning tool at an appropriate machining position.

The gear cutting device 40 preferably includes a hob head unit 42 that is mounted on the traverse slide base 41. A hob head 43 may be mounted on the front vertical surface of the hob head unit 42 and may rotate around a rotational axis that is perpendicular to the spindle 11. A tool post 44 may be mounted on the hob head 43 and may be arranged and constructed to slide in the direction of the Y-axis (vertical direction). A hob 45 may be rotatably attached or supported by the tool post 44 and the hob 45 preferably is utilized to perform gear cutting operations. That is, the hob 45 is preferably a cutting tool that can be utilized to cut the teeth of gears or worm wheels. Further, a first motor 46 for driving the hob spindle (see FIG. 3) may be mounted within the hob head unit 42 in order to rotate the hob 45. A second motor 47 may be mounted on the hob head unit 42 in order to change the inclination of the hob 45 along its axial (longitudinal) direction. A hob shift motor 48 is preferably mounted on the hob head 43 in order to vertically move the hob 45.

The hob 45 and the workpiece (not shown) form a crossing angle during operation and the crossing angle can be changed in accordance with the module or spiral angle of the gear or other part that will be manufactured. In one representative embodiment, the second motor 47 may be driven to rotate the hob head 43 with respect to the hob head unit 42 and thereby change the mounting angle of the hob 45. In addition, the hob 45 can be shifted in accordance with the amount of wear of the cutting edge of the tool by driving the hob shift motor 48 in order to vertically move the tool post 44 with respect to the hob head 43.

Because the turning device 30 and the gear cutting device 40 are separately disposed side by side, this representative machine tool is capable of independently performing both a turning or lathe operation (e.g. by using the turning tool of the turning device 30) and a gear cutting operation (e.g. by using the hob 45 of the gear cutting device 40). The machining operations may be performed on the outer surface of a workpiece, e.g. a cylindrical bar, by supporting the ends of the workpiece between the chuck 12 and the shaft 21. Consequently, the turning and gear cutting operations can both be performed using a single chuck to support the workpiece.

When performing a turning or lathe operation using the turning tool of the turning device 30, the gear cutting device 40 is preferably moved to a position that avoids interference with the turning device 30. Similarly, when performing a gear cutting operation using the hob 45 of the gear cutting device 40, the turning device 30 is preferably moved to a position that avoids interference with the gear cutting device 40. In one representative embodiment, the gear cutting device 40 and/or the turning device 30 may be withdrawn from the workpiece along the direction of the X-axis in FIG. 2 when it is not in use.

During a turning or lathe operation, the movement of the carriage 50 is controlled in the direction of the Z-axis (longitudinal slide), the movement of the traverse slide base 31 is controlled in the direction of the X-axis (traverse slide) and the rotation of the turret 33 is also controlled in order to choose the appropriate turning or lathe tool(s) for the machining operation. A controller (not shown) may be utilized with the machine tool in order to perform these controlling operations and the controller can be programmed according to known complex machining tool control programs. Turning operations may be performed, for example, using a cutting tool to cut the workpiece and/or a drill. During the turning operation, the rotational speed of the workpiece and/or the turning tools may be constant or varied as desired for the particular turning operation. In addition, the workpiece may be held stationary (i.e. without rotating) during a machining operation.

Further, when a gear cutting operation is performed using the hob 45 of the gear cutting device 40, the movement of the carriage 50 is controlled in the direction of the Z-axis (longitudinal slide), the movement of the traverse slide base 41 is controlled in the direction of the X-axis (traverse slide), the rotation of the hob head 43 is controlled in the direction of the Z-axis and the movement of the tool post 44 is controlled in the direction of the Y-axis. As in the turning operation, a controller (not shown) may be utilized to perform these controlling movements for the gear cutting operation. During the gear cutting operation, the rotational speeds of the workpiece and the hob 45 may be constant or varied as necessary for the particular gear cutting operation. Moreover, the workpiece may be held in a stationary position (i.e. without rotating), if desired.

Consequently, the representative embodiment provides a carriage 50 that may be commonly used in both the turning operation and the gear cutting operation. The carriage 50 preferably is constructed to move both the turning tool and the gear cutting tool in the direction of the Z-axis. Therefore, the sliding mechanism (such as a driving motor and a gear) that moves the carriage 50 also can be commonly used for both the turning device 30 and the gear cutting device 40. As a result, the number of parts can be substantially reduced and the machining tool can be manufactured at a lower cost compared to known machining tools that require a separate carriage for each of the turning device and the gear cutting device and thus, also require separate sliding mechanisms for moving the respective carriages.

Various modifications can be made to the present teachings. For example, the turning device 30 and the gear cutting device 40 may be constructed using various designs. Further, the turning device 30 is not required to include a turret. The arrangement of the carriage 50 with respect to the bed 1 may be variously modified in order to permit the carriage 50 to move with respect to the bed 1.

Moreover, various changes or modifications may be made to the components that permit the turning device 30 to move with respect to the traverse slide base 31 in the direction of the X-axis and to the components that permit the gear cutting device 40 to move with respect to the traverse slide base 41 in the direction of the X-axis. In addition, the direction of movement of the turning device 30 and the gear cutting device 40 with respect to the carriage 50 is not limited to the direction that is generally perpendicular to the rotational axis of the spindle 11.

What is claimed is:

1. An apparatus for machining a workpiece comprising:
    a bed,
    a headstock disposed on the bed and arranged and constructed to rotatably support a first end of the workpiece, wherein at least one of the headstock or the tailstock is slidably disposed on the bed so as to permit adjustment of the distance between the headstock and the tailstock,
    a carriage disposed on the bed between the headstock and the tailstock and arranged and constructed to move in a direction of Z-axis along a longitudinal axis of the supported workpiece,
    a lathe tool operably and slidably disposed on the carriage,
    a hob operably and slidably disposed on the carriage, wherein the lathe tool and the hob are arranged and constructed to move on the carriage in a direction of X-axis that is generally perpendicular to the Z-axis so that one of the hob and the lathe tool can selectively engage the workpiece without interference of the other of the hob and the lathe tool that is not performing a machining operation, and wherein the hob is rotatable about the X-axis and is movable in a direction of Y-axis that is perpendicular to the Z-axis and the X-axis.

2. An apparatus as in claim 1, wherein the hob is rotatable about the Y-axis.

3. An apparatus as in claim 1, wherein the carriage causes the lathe tool to perform a machining operation on the workpiece without interference of the hob by moving the hob away from the workpiece when the hob is not in use.

4. An apparatus as in claim 1, wherein the carriage causes the hob to perform a machining operation on the workpiece without interference of the lathe tool by moving the lathe tool away from the workpiece when the lathe tool is not in use.

5. An apparatus as in claim 1, further comprising a first transverse slide base that slidably couples the carriage to the lathe tool and a second transverse slide base that slidably couples the hob to the carriage, wherein the first and second transverse slide bases are arranged and constructed to move independently in the direction of X-axis.

6. An apparatus as in claim 5, further including a turning head unit and a turret, wherein the turning head unit is mounted on the first transverse slide base, the turret is mounted on the turning head unit and is rotatable relative to the turning head unit about the Zaxis, and the lathe tool is mounted on the turret.

7. A method for machining a workpiece using an apparatus as in claim 1, comprising in any order:
    sliding the hob on the carriage any from the workpiece in order to avoid interference with the lathe tool and engaging the lathe tool with the workpiece in order to perform a turning or lathe operation and
    sliding the lathe tool on the carriage any from the workpiece in order to avoid interference with the hob and engaging the hob with the workpiece in order to perform a gear cutting operation.

8. A machining tool for performing complex machining operations, comprising:
- a headstock adapted to support a first end of a workpiece, the headstock comprising a spindle having a rotational axis,
- a tailstock adapted to support a second end of the workpiece,
- a lathe device arranged and constructed to perform a lathe operation on the workpiece,
- a gear cutting device arranged and constructed to perform a gear cutting operation on the workpiece and
- a single carriage supporting the lathe device and the gear cutting device, wherein:
- the carriage is arranged and constructed to move in a direction of Zaxis that is generally parallel to the rotational axis of the spindle,
- the lathe device and the gear cutting device comprises respective traverse slide bases that are arranged and constructed to move independently in a direction of Xaxis relative to the carriage, which X-axis is generally perpendicular to the rotational axis of the spindle,
- the gear cutting device comprises a hob head unit and a hob,
- the hob head unit is mounted on the corresponding traverse slide base and is operable to perform gear cutting operations of the workpiece, and
- the hob is rotatable about the Xaxis and is movable in a direction of Y-axis that is generally perpendicular to the X-axis and the Z-axis.

9. A machining tool as in claim 8, wherein the gear cutting device further includes a tool post that is movable in the direction of Y-axis relative to the hob head unit, and the hob is mounted on the tool post.

10. A machining tool as in claim 9, wherein the hob is rotatable relative to the tool post.

11. A machining tool as in claim 8, wherein the lathe device includes a turning head unit and a turret, and the turret is mounted on the turning head unit and is rotatable relative to the turning head unit about the Z-axis.

* * * * *